Oct. 13, 1953     K. E. SCHIERMEIER     2,655,430
METHOD OF MAKING CALCIUM SULFATE FROM REFINERY WASTE ACID
Filed May 18, 1948
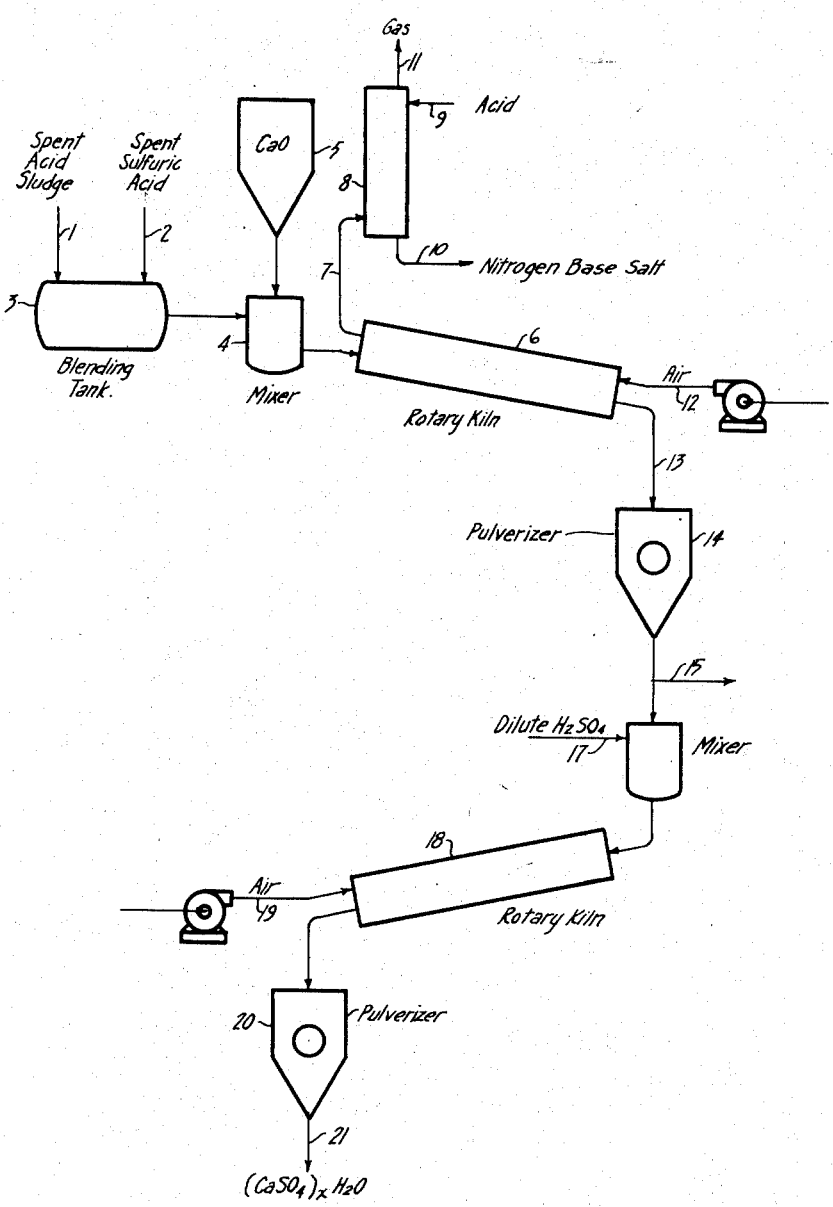
Inventor: Knapel F. Schiermeier
By: Oswald H. Wilmore
His Attorney Patented Oct. 13, 1953

2,655,430

UNITED STATES PATENT OFFICE 2,655,430

METHOD OF MAKING CALCIUM SULFATE FROM REFINERY WASTE ACID

Knapel F. Schiermeier, Alton, Ill., assignor to Shell Development Company, San Francisco, Calif., a corporation of Delaware Application May 18, 1948, Serial No. 27,705

12 Claims. (Cl. 23—122)

This invention relates to the manufacture of calcium sulfate from refinery waste sulfuric acid, and to the disposal of refinery sulfuric acid sludges and spent sulfuric acid.

The present methods of handling and disposing of refinery waste acids usually involve burning and dumping into pits. Aside from the cost of such operations, and the cost of maintaining equipment which is subject to rapid deterioration, this method represents an economic loss and causes losses to the community because of corrosion due to heavy $SO_3$ fumes liberated in burning.

It is, therefore, an object of the invention to provide a useful method of disposing of waste refinery acid and of producing thereby a useful product, viz., calcium sulfate.

A further object is to provide a process for utilizing waste refinery acids for the manufacture of calcium sulfate wherein nitrogen bases and other constituents of the acid may be recovered.

According to the invention, waste refinery sulfuric acid, e. g., fuel oil sludge, heavy oil sludge, spent sulfuric acid (i. e., sulfuric acid which has been used as a catalyst in various hydrocarbon reactions, such as the alkylation of hydrocarbons, and has become diluted and/or contaminated to the point at which it is discarded) is mixed with lime and calcined to produce relatively pure calcium sulfate, the proportion of water present being dependent upon the degree and conditions of calcination as explained hereinafter. It is usually desirable to produce a product containing less than 7% water, e. g., 6.2% water. Thus, it is possible to produce a salt containing only traces of moisture, or plaster of Paris $2CaSO_4 \cdot H_2O$, or salts of intermediate composition, e. g.,

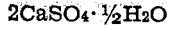
$$2CaSO_4 \cdot \tfrac{1}{2}H_2O$$

I may use any refinery waste acid containing sulfuric acid, such as those enumerated above, either singly or in combination. It was found that these various waste acids are compatible, and I prefer to use a blend containing an appreciable proportion of spent acid, e. g., a blend containing at least 25% of spent alkylation acid, to improve the fluidity of the blend and to increase the free sulfuric acid content to facilitate the reaction.

The process will be better understood by reference to the accompanying drawing forming a part of this specification and showing a schematic flow diagram illustrating the successive operations according to one preferred embodiment of the invention.

Referring to the drawing, sulfuric acid sludge and spent sulfuric acid are fed via lines 1 and 2, respectively, into a blending tank 3. The resulting blend is liquid, at times somewhat viscous, and is passed into a mixer 4 wherein it is mixed with pure or commercial lime (CaO or $Ca(OH)_2$), preferably finely pulverized lime, supplied from a hopper 5. The lime is added approximately in the amount necessary to neutralize all of the available sulfuric acid, e. g., from 90% to 105% of the theoretical stoichiometrical amount, and preferably from 95% to 98% of the theoretical amount. "Available sulfuric acid" includes the free sulfuric acid in the blend and, in addition, sulfuric acid combined with certain substances, such as petroleum nitrogen bases, which are liberated during the reaction to yield sulfuric acid. The pulverized lime dissolves readily in the waste acid blend at ordinary temperatures, and the temperature of the resulting mixture or slurry rises rapidly after a short contact time due to the exothermic reaction, causing the vaporization of water and some other volatile constituents, e. g., nitrogen bases, light oils, etc. and leaves a residue of a solid cake. I may permit the mixture to react for a period from half a minute to several minutes before transferring it to a rotary kiln 6, or may effect such transfer promptly upon complete mixing, e. g., continuously before the reaction is complete and while the mixture is still fluid. In either event, the mixture may be transferred to the kiln together with fumes or without fumes liberated in the mixer, using a hooded conveyor for the purpose.

The slurry or mixture is heated in the kiln 6 to the desired temperature by any suitable source of heat (not shown), such as an external electric heater or gas flame, to cause or continue the liberation of fumes. These fumes contain steam, oil and nitrogen bases. A typical range of operating temperatures may, for example, be 200° F. at the inlet end and 1000° F. for the last two-thirds of the length of the kiln, although higher temperatures, e. g., up to 1700° F. may be used. Air is admitted into the kiln from line 12. All hydrocarbons and carbon present in the mixture burns off above about 900° F. The residence time in the kiln depends upon the nature of the waste acid and the temperature; it is usually from 15 to 30 minutes. If desired an oxidizing flame with sufficient air for complete oxidation of the product can be used within the kiln instead of or together with the external heat.

The fumes (together with those, if any, introduced from the mixer 4) are withdrawn through a vapor line 7. They may, if desired after cooling, be passed into the base of a scrubbing tower 8, provided with suitable gas-liquid contact means, such as packing, and flowed upwardly, countercurrently to any inorganic acid, e. g., aqueous hydrochloric or sulfuric acid, introduced via line 9. The acid forms salts with the nitrogen bases and the resulting aqueous acid and salt extract solution is withdrawn at the bottom via line 10 for further treatment to recover the nitrogen bases. Unreacted and undissolved fumes pass out through line 11.

Reverting to the kiln, the calcined product, substantially free from hydrocarbons, carbon, and other petroleum impurities, is withdrawn via line 13, pulverized in a mill 14, and may be withdrawn as a product at 15. This product consists primarily of $CaSO_4$ and may contain inorganic impurities, dependent upon the purity of the lime, and, in addition, varying amounts of CaS and CaO. CaS is believed to be formed primarily by the reduction of $CaSO_4$ by the burning of the hydrocarbons; the amount thereof in the calcined product can be reduced by careful calcination, i. e., by adding sufficient air to maintain an oxidizing atmosphere and by thorough agitation. CaO in the calcined product is due to unreacted lime and the quantity thereof can be reduced by fine subdivision of the lime, by complete mixing in the mixer 4, and by using a smaller quantity of lime.

Because it is not generally feasible to avoid entirely the presence of CaS and/or CaO in the calcined product, I prefer to feed the pulverized material into a mixer 16 and add to it a small amount of dilute, e. g., about 3% sulfuric acid from line 17. The amount of $H_2SO_4$ admitted is that required to react with all the CaS and CaO, while the amount of water is that required to supply water for hydration. The resulting wet powder is fed into a rotary kiln 18, wherein it is heated to a drying temperature, e. g., about 270 to 370° F., in the presence of air admitted via line 19.

The time required for the dehydration in the kiln 18 depends upon the degree of pulverization of the cake, the degree of agitation in the kiln, the temperature of the kiln, and the amount of excess air. A typical time is 15–30 minutes. Dried calcium sulfate is passed through a mill or pulverizer 20, the product being withdrawn at 21.

While I have illustrated, by reference to the drawing, a preferred embodiment, suitable for continuous operation, it should be understood that I may vary the details of the individual steps and may carry out some or all of them in different apparatus or batchwise. For example, if a batch mixture is produced in the mixer 4 and is not immediately fed into the kiln, the temperature will rise rapidly to about 320° F., liberating fumes, leaving a brittle, black, porous cake as residue. This cake may be broken into pieces, or pulverized, and calcined by burning in a muffle furnace at red heat, or calcined in the kiln 6. The product may then be passed into the mill 14.

According to a further variant, I may recover heavier nitrogen bases from the cake formed by letting the waste acid-lime mixture stand and by leaching this cake prior to calcination with a weak acid which forms salts with the nitrogen bases, or I may recover other compounds, such as sulfonates, which may be present in the acid-lime cake, by leaching with solvents, e. g., aqueous alcohol, water, methyl isobutyl ketone, etc.

Example

A waste acid blend was prepared by mixing 27 parts of fuel oil sulfuric acid sludge, 18% of heavy oil sulfuric acid sludge, and 55% spent sulfuric acid which had been used as an alkylation catalyst. The blend was about of the fluidity of oil of 100 seconds Saybolt Universal viscosity at 100° F., and contained available acid equivalent to 71% $H_2SO_4$.

The blend was thoroughly mixed with just sufficient pulverized lime for neutralization of the acid, the lime being readily dispersed and apparently dissolved. The temperature of the mixture increased from 90° F. to 170° F. in one minute due to the exothermic reaction and then increased rapidly to about 320° F., liberating steam, oil and nitrogen bases. The brittle, black, porous cake left as a residue was broken into pieces and burned in a muffle furnace at red heat. The product was free from carbon and oil, had a light gray color, and consisted of $CaSO_4$ with 2.2% CaS and 1.7% CaO. The residue was cooled, pulverized, and wet with 2 to 3 times its weight of 3% $H_2SO_4$ to supply water of hydration. It was then dried at about 370° F. for 30 minutes and pulverized. The resulting product was a white powder which set fairly hard in a short time when mixed with water. Analysis showed the product to contain 2.5% $H_2O$ (a little less than half of the theoretical amount for plaster of Paris). Other impurities were: iron, approximately 0.25%; magnesium and strontium, approximately 0.05%; traces of aluminum, vanadium and nickel.

The amount of water in the product can be controlled by controlling the extent of drying; thus, I can produce calcium sulfate containing about 6.2% water by using a lower drying temperature, a lower drying temperature and a longer drying time, or by drying for a shorter time than in the example. Confined storage of the pulverized product aids in fixing the water in the calcium sulfate as the semi-hydrate which improves its setting characteristics.

I claim as my invention:

1. In a method of making calcium sulfate from refinery waste sulfuric acid containing petroleum contaminants the steps of mixing said acid with lime approximately in the proportion to neutralize the available sulfuric acid, and removing substantially all of said contaminants by calcining the resulting mixture at a temperature above about 900° F. in an oxygen-containing gas and thereby burning said contaminants to produce a calcium sulfate product substantially free from carbon and hydrocarbon material.

2. The method according to claim 1 wherein the refinery waste acid is sulfuric acid sludge obtained by treating petroleum with sulfuric acid.

3. The method according to claim 1 wherein the refinery waste acid is spent alkylation acid.

4. The method according to claim 1 wherein the refinery waste acid is a blend containing sulfuric acid sludge obtained by treating petroleum with sulfuric acid and spent alkylation acid.

5. The method according to claim 1 wherein the calcination temperature is between about 1000° F. and 1700° F.

6. A method of making calcium sulfate from refinery waste sulfuric acid containing petroleum contaminants comprising the steps of mixing said acid with lime approximately in the proportion to neutralize the available sulfuric acid; removing substantially all of said contaminants by calcining the resulting mixture at a temperature above about 900° F. in an oxidizing atmosphere and thereby burning said contaminants to produce a product substantially free from carbon and hydrocarbon material; comminuting the calcined product; adding dilute aqueous sulfuric acid to the comminuted calcined product to wet the latter and to react with CaS and CaO impurities occurring in the said product; and drying the wetted material to produce calcium sulfate containing less than 7% water.

7. The method according to claim 6 wherein the wetted material is dried to produce calcium sulfate containing approximately 6.2% water.

8. The method according to claim 6 wherein the wetted material is dried to produce calcium sulfate containing approximately 3.1% water.

9. The method according to claim 6 wherein the wetted material is dried to produce substantially anhydrous calcium sulfate.

10. A method of making calcium sulfate from refinery waste sulfuric acid containing petroleum impurities comprising the steps of mixing said acid with lime approximately in the proportion to neutralize the available sulfuric acid, calcining the resulting mixture in a rotary kiln at a temperature above about 900° F. while passing air therethrough to oxidize the petroleum impurities contained in the waste acid, comminuting the calcined product, adding dilute aqueous sulfuric acid to the comminuted calcined product to wet the latter and to react with CaS and CaO impurities, and drying the wetted material in a rotary kiln at a temperature between about 270° F. and 370° F., in the presence of air to produce calcium sulfate containing less than 7% water.

11. In a method of making calcium sulfate from refinery waste sulfuric acid containing petroleum contaminants comprising the steps of mixing said acid with lime approximately in the proportion to neutralize the available sulfuric acid; permitting the resulting mixture to react exothermally with a rise in temperature to form a cake and give off fumes; comminuting the resulting cake; and removing substantially all of the contaminants remaining in the cake by calcining the comminuted cake at a temperature above about 900° F. in an oxygen-containing gas and thereby burning said remaining contaminants to produce calcium sulfate product substantially free from carbon and hydrocarbon material.

12. The method according to claim 11 wherein the comminuted cake is calcined by heating it in a muffle furnace at red heat to burn said contaminants.

KNAPEL F. SCHIERMEIER.

References Cited in the file of this patent

UNITED STATES PATENTS

| Number | Name | Date |
|---|---|---|
| 292,260 | Semper | Jan. 22, 1884 |
| 862,962 | Koppers | Aug. 13, 1907 |
| 1,570,583 | Wilson | Jan. 19, 1926 |
| 2,031,898 | Marsh | Feb. 25, 1936 |
| 2,151,147 | Piotrowski et al. | Mar. 21, 1939 |
| 2,309,633 | Du Pont et al. | Feb. 3, 1943 |

FOREIGN PATENTS

| Number | Country | Date |
|---|---|---|
| 238,072 | Great Britain | Aug. 13, 1925 |
| 320,891 | Great Britain | Oct. 23, 1929 |

OTHER REFERENCES

Mellor, Comprehensive Treatise on Inorganic and Theoretical Chemistry, Longmans, Green and Co., New York, 1923, vol. 3, pp. 744, 762 and 763.

Kalichevsky et al., Chemical Refining of Petroleum. The Chemical Catalog Company, New York (1933) page 42.